(12) United States Patent
Javidi et al.

(10) Patent No.: US 8,264,772 B2
(45) Date of Patent: Sep. 11, 2012

(54) DEPTH AND LATERAL SIZE CONTROL OF THREE-DIMENSIONAL IMAGES IN PROJECTION INTEGRAL IMAGING

(75) Inventors: Bahram Javidi, Storrs, CT (US); Ju-Seog Jang, Busan (KR); Hyunju Ha, legal representative, Busan (KR)

(73) Assignee: The University of Connecticut, Farmington, CT (US)

( * ) Notice: Subject to any disclaimer, the term of this patent is extended or adjusted under 35 U.S.C. 154(b) by 0 days.

(21) Appl. No.: 12/939,647

(22) Filed: Nov. 4, 2010

(65) Prior Publication Data

US 2011/0043611 A1     Feb. 24, 2011

Related U.S. Application Data

(62) Division of application No. 11/498,666, filed on Aug. 3, 2006, now abandoned.

(60) Provisional application No. 60/706,281, filed on Aug. 8, 2005.

(51) Int. Cl.
*G02B 27/22* (2006.01)

(52) U.S. Cl. ............................................. 359/462; 353/7
(58) Field of Classification Search .................. None
See application file for complete search history.

(56) References Cited

U.S. PATENT DOCUMENTS

| | | |
|---|---|---|
| 2002/0114077 A1 | 8/2002 | Javidi |
| 2003/0020809 A1 | 1/2003 | Gibbon et al. |
| 2004/0061934 A1 | 4/2004 | Lee et al. |
| 2004/0184145 A1 | 9/2004 | Fridman et al. |

FOREIGN PATENT DOCUMENTS

| | | |
|---|---|---|
| DE | 102004040538 A1 | 3/2005 |
| EP | 0404289 A2 | 6/1990 |
| WO | WO2006/050428 A2 | 5/2006 |

OTHER PUBLICATIONS

P. Ambs, L. Bigue, R. Binet, J. Colineau, J.-C. Lehureau and J.-P. Huingnard, •Image Reconstruction using Electrooptic Holography,• Proceedings of the 16th Annual Meeting of the IEEE Lasers and Electro-Optics Society, LEOS 200, vol. 1 (IEEE Piscataway, NJ, 2003) pp. 172-173.

J. Arai, F. Okano, H. Hoshino, and I. Yuyama, •Gradient-index lens-array method based on real-time integral photography for three-dimensional images,• Appl. Opt. 37, 2034-2045 (1998).

S. A. Benton, ed., •Selected Papers on Three-Dimensional Displays,• (SPIE Optical Engineering Press, Bellingham, WA, 2001; SPIE Milestone Series vol. MS162/HC (Table of Contents Attached).

C.B. Burckhardt, •Optimum Parameters and Resolution Limitation of Integral Photography, • J. Opt. Soc. Am. 58, 71-76 (1968).

N. Davies, M. McCormick, and M. Brewin, •Design and analysis of an image transfer system using microlens arrays,• Opt. Eng. 33, 3624-3633 (1994).

(Continued)

*Primary Examiner* — Lee Fineman
(74) *Attorney, Agent, or Firm* — Cantor Colburn LLP

(57) ABSTRACT

A method disclosed herein relates to displaying three-dimensional images. The method comprising, projecting integral images to a display device, and displaying three-dimensional images with the display device. Further disclosed herein is an apparatus for displaying orthoscopic 3-D images. The apparatus comprising, a projector for projecting integral images, and a micro-convex-mirror array for displaying the projected images.

11 Claims, 9 Drawing Sheets

OTHER PUBLICATIONS

H. Hoshino, F. Okano, H. Isono, and I. Yuyama, •Analysis of resolution limitation of integral photography,• J. Opt. Soc. Am. A 15, 2059-2065 (1998).

Notification of Transmittal of the International Search Repot and the Written Opinion of the International Searching Authority, or the Declaration; PCT/US2006/030513; European Patent Office; Mailed Apr. 13, 2007.

H. E. Ives, •Optical properties of a Lippman lenticulated sheet,• J. Opt. Soc. Am. 21, 171-176 (1931).

J.-S. Jang, Y.-S. Oh, and B. Javidi, •Spatiotemporally multiplexed integral imaging projector for large-scale high-resolution three-dimensional display,• Opt. Express 12, 557-563 (2004).

J.-S. Jang and B. Javidi, •Very-large scale integral imaging (VLSII) for 3D display,• to appear in the Journal of Optical Engineering, (2005).

J.-S. Jang and B. Javidi, •Improved viewing resolution of three-dimensional integral imaging with nonstationary micro-optics,• Opt. Lett. 27, 324-326 (2002).

J.-S. Jang and B. Javidi, •Large depth-of-focus time-multiplexed three-dimensional integral imaging using lenslets with non-uniform focal lengths and aperture sizes,• Opt. Lett. 28, 1924-1926 (2003).

J.-S. Jang and B. Javidi, •Three-dimensional projection integral imaging using micro-convex-mirror arrays,• Opt. Express 12, 1077-1083 (2004).

J.-S. Jang, F. Jin, and B. Javidi, •Three-dimensional integral imaging with large depth of focus using real and virtual image field,• Opt. Lett. 28, 1421-1423 (2003).

Y. Kim, J. Park, H. Choi, S. Jung, S. Min, and B. Lee, •Viewing angle-enhanced integral imaging system using a curved lens array,• Opt. Express 12, 421-429 (2004).

G. Lippman, •La photographic integrale,• Comptes-Rendus Academic des Sciences 146, 446-465 (1908).

D. H. McMahon and H. J. Caulfield, •A Technique for Producing Wide-Angle Holographic Displays,• Apl. Opt. 9, 91-96 (1970).

S.-W. Min, B. Javidi and B. Lee, •Enhanced three-dimensional integral imaging system by use of double display devices,• Appl. Opt. 42, 4186-4195 (2003).

F. Okano, H. Hoshino, J. Arai and I. Yuyama, •Real-time pickup method for a three-dimensional image based on integral photography,• Appl. Opt. 36, 1598-1603 (1997).

T. Okoshi, •Three Dimensional Displays,• Proc. IEEE 68 548-564 (1980).

A.R.L. Travis, •The Display of Three-Dimensional Video Images,• Proc. of IEEE 85 1817-1832 (1997).

I. Yamaguchi and T. Zhang, •Phase-shifting digital holography,• Opt. Lett. 22, 1268-1270 (1977).

Left view    Center view    Right view

Left view    Center view    Right view

DEPTH AND LATERAL SIZE CONTROL OF THREE-DIMENSIONAL IMAGES IN PROJECTION INTEGRAL IMAGING

CROSS REFERENCE TO RELATED APPLICATIONS

This application is a divisional application of U.S. application Ser. No. 11/498,666, which was filed on Aug. 3, 2006. Application Ser. No. 11/498,666 claims priority to U.S. provisional application 60/706,281 filed on Aug. 8, 2005, which is incorporated herein in its entirety by reference.

BACKGROUND OF THE INVENTION

Most 3D display techniques developed to date are stereoscopic. A stereoscopic system may be realized that may display large images with high resolution, however stereoscopic techniques may require supplementary glasses to evoke 3-D visual effects. Additionally, stereoscopic techniques may provide observers with horizontal parallax and a small number of viewpoints. Observation of stereoscopic images may also cause visual fatigue due to convergence-accommodation conflict.

Convergence-accommodation conflict may be avoided by a true 3-D image formation in space with full parallax and continuous viewing points. Holography is one way to form 3-D images in space, but recording full-color holograms for an outdoor scene may be difficult. For example, when computer-generated holograms are prepared, a large amount of computation time and capacity may be required to obtain proper gratings. Because coherent light is often used in holography, speckle may also occur.

To produce true 3-D images in space with incoherent light using two-dimensional (2-D) display devices, techniques based on ray optics have also been studied. One technique may be referred to as integral imaging (II).

In II, 3-D images may be formed by crossing the rays coming from 2-D elemental images using a lenslet array. Each microlens in a lenslet array may act as a directional pixel in a pinhole fashion. The pinholes create directional views which when viewed with two eyes for example, appear as a 3D image in space. II may provide observers with true 3-D images with full parallax and continuous viewing points. However, the viewing angle, depth-of-focus, and resolution of 3-D images may be limited.

In addition, 3-D images produced in direct camera pickup II are pseudoscopic (depth-reversed) images, and thus may make II systems more complex and thus more impractical.

Advancements in the art are needed to increase viewing angles and improve image quality. Also needed are ways to display, images of large objects that are far from the pickup device. Additionally needed advancements include the ability to project 3-D images to a large display screen.

BRIEF DESCRIPTION OF THE INVENTION

A method disclosed herein relates to a method of displaying three-dimensional images. The method comprising, projecting integral images to a display device, and displaying three-dimensional images with the display device.

Further disclosed herein is a method that relates to controlling the depth of 3-D images when recording and displaying 3-D images. The method comprising, magnifying elemental images during pickup, projecting the magnified elemental images via an optics relay to a display device, and displaying 3-D images within the depth-of-focus of the display device while maintaining lateral image sizes.

Further disclosed herein is a method that relates to controlling the depth of 3-D images when recording and displaying 3-D images with planar pickup and planar display devices. The method comprising, positioning an optical path-length-equalizing (OPLE) lens adjacent to a planar lenslet array, projecting 3-D images via an optics relay to a planar display device, and displaying 3-D images within the depth-of-focus of the display device.

Further disclosed herein is a method that relates to recording and displaying 3-D images. The method comprising, generating elemental images with a micro-lenslet array, increasing disparity of elemental images with an optical path-length-equalizing (OPLE) lens, recording the elemental images on an imaging sensor of a recording device. The method further comprising, projecting 3-D images through an optical relay to a display device, and displaying the 3-D images within the depth-of-focus of the display device.

Further disclosed herein is an apparatus for displaying orthoscopic 3-D images. The apparatus comprising, a projector for projecting integral images, and a micro-convex-mirror array for displaying the projected images.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Methods and devices to control the depth and lateral size of reconstructed 3-D images are disclosed. These methods and devices may be used with a novel "Projection" Integral Imaging (PII) system for example.

One described technique allows pick up of large 3-D objects that may be far away, and also allows the display of their demagnified 3-D images within the depth-of-focus of II systems. It is shown that curved pickup devices (i.e., a curved 2-D image sensor and a curved lenslet array) or curved display devices or both may be used for this purpose. When the lenslets in the curved array have a zooming capability, a linear depth control is additionally possible.

Two exemplary methods are discussed below alone and also when they are used together. In experiments to demonstrate the feasibility of our method, planar pickup devices may be used (lenslet array, sensor, and display). An additional large aperture negative lens, also referred to herein as an optical path-length-equalizing (OPLE) lens, is placed in contact with the pickup lenslet array.

It should be noted that in this disclosure the term "recording" is used interchangeably with "pickup" and the term "reconstruction" is used interchangeably with "display."

Review of Integral Imaging

Conventional Integral Imaging (CII)

In CII, planar lenslet arrays with positive focal lengths have been used as depicted in FIG. 1.

Figure 1A:
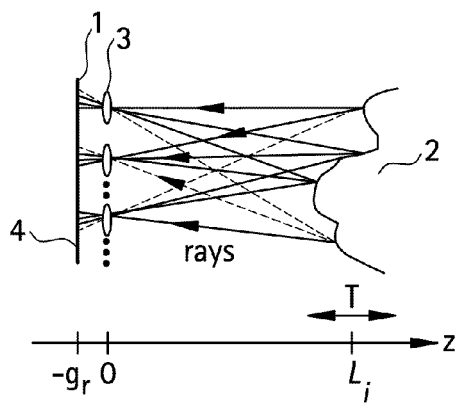
FIGS. 1a, 1b, and 1c are side views of an integral imaging (II) arrangements using planar devices.
Figure 1B:
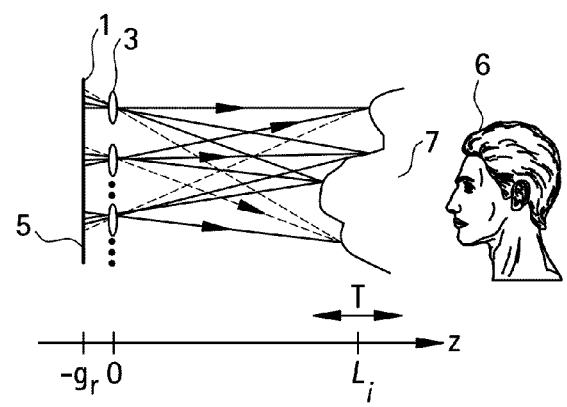

As depicted in FIG. 1(a), a set of elemental images 1 of a 3-D object 2 (i.e., direction and intensity information of the spatially sampled rays coming from the object) may be obtained by use of a lenslet array 3 and a 2-D image sensor 4 such as a charged coupled device (CCD) or a complementary metal oxide semiconductor (CMOS) image sensor. As depicted in FIG. 1(b), to reconstruct a 3-D image 7 of the object 2, the set of 2-D elemental images 1 may be displayed in front of a lenslet array 3 using a 2-D display panel 5, such as a liquid crystal display (LCD) panel.

Figure 1C:
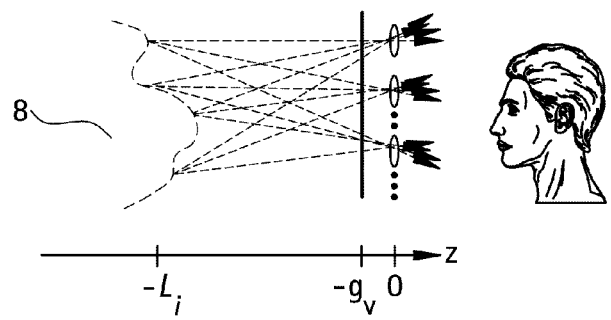

Further, with reference to FIGS. 1a and 1b, in one example, the lenslet array 3 with focal length f may be positioned at $z=0$, and the display panel at $z=-g$. From the Gauss lens law:

$$\frac{1}{g} + \frac{1}{L_i} = \frac{1}{f}, \quad (1)$$

it is shown that the gap distance g should be $L_i f/(L_i-f) \equiv g_r$, where it may be assumed that 3-D real images 7 are formed around $z=L_i$. The rays coming from elemental images converge to form a 3-D real image through the lenslet array 3. The reconstructed 3-D image may be a pseudoscopic (depth-reversed) real image 7 of the object 2. To convert the pseudoscopic image to an orthoscopic image, a process to rotate every elemental image by 180 degrees around its own center optic axis may be used. The orthoscopic image becomes a virtual image 8 by this P/O conversion process. Also, as shown in FIG. 1c, when the 3-D virtual image 8 is formed around $z=-L_i$, the gap distance g should be $L_i f/(L_i+f) \equiv g_v$ for optimal focusing from Eq. (1).

Projection Integral Imaging (PII)

Projection integral imaging (PII) is the novel subject of this invention. In other words, the inventors were the first to invent projection integral imaging (PII).

Figure 2A:
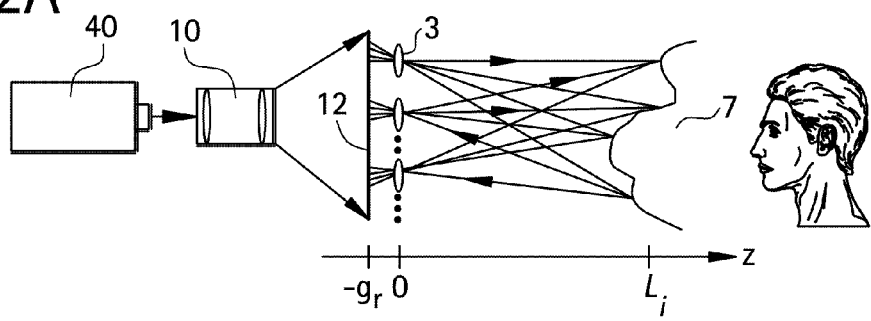
FIGS. 2a, 2b, 2c, and 2d are side views of a projection integral imaging (PII) arrangements using planar devices.
Figure 2B:
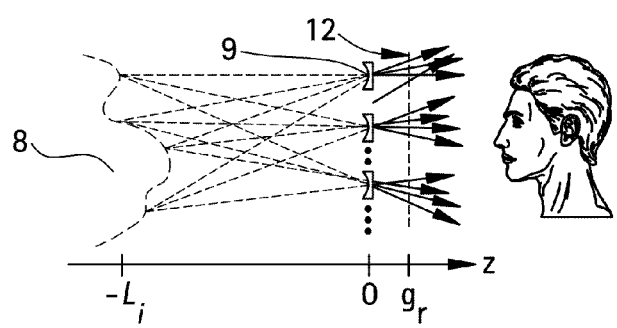
Figure 2C:
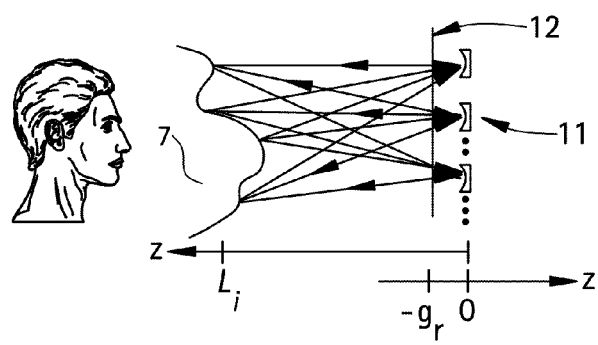
Figure 2D:
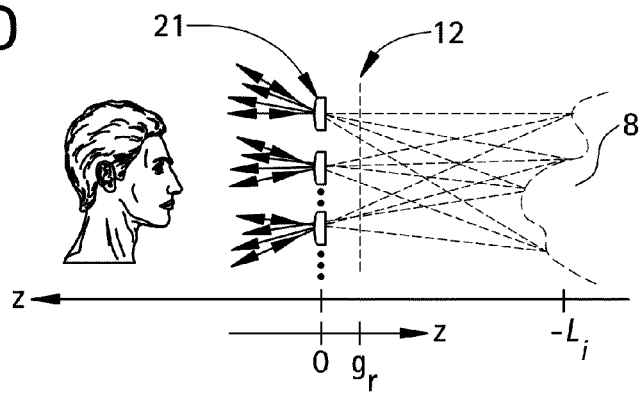

As shown in FIG. 2a, in PII, the process to obtain elemental images is not substantially different from that in CII. However, elemental images may be projected through relay optics 10 onto a lenslet array 3 as depicted in FIGS. 2(a) and (b). A micro-convex/concave-mirror array 11, 21 as a projection screen may be used, as depicted in FIGS. 2(c) and (d). When a lenslet array 3 with a positive focal length is used or a micro-concave-mirror array 11 is used, the in-focus plane of projected elemental images 12 may be positioned at $z=-g_r$, as depicted in FIGS. 2(a) and (c). If P/O-converted elemental images are used to display 3-D orthoscopic virtual images 8, which are formed around $z=-L_i$, the in-focus plane of projected elemental images 12 should be positioned at $z=-g_v$.

When a lenslet array with a negative focal length 9 is used or a micro-convex-mirror array 21, 3-D orthoscopic virtual images 8 may be displayed without the P/O conversion. For example, suppose that 3-D images 8 are formed around $z=-L_i$ and the focal length of the lenslet array 9 (or the micro-convex-mirror array 21) is $-f$. Then, the gap distance g becomes $L_i f/(f-L_i) \equiv -g_r$ from Eq. (1). Thus the in-focus plane of projected elemental images 12 may be positioned at $z=+g_r$ as depicted in FIGS. 2(b) and (d). On the other hand, when 3-D real images 7 are displayed around $z=L_i$, the in-focus plane of projected elemental images 12 may be positioned at $z=+g_v$. Because $L_i \gg f$ in both PII and CII, $g_r \approx g_v \approx f$.

Advantages of PII Over CII

PII allows for the following because of the use of a micro-convex-mirror array as a projection screen:

First, viewing angle is enhanced. In II, the full viewing angle ψ is limited and determined approximately by 2× arctan [0.5/(f/#)], where f/# is the f number of the lenslet, when the fill factor of the lenslet array is close to 1.

Also, it is easier to make diffraction-limited (or aberration-free) convex mirrors with a small f/# than it is to make similar lenslets. A convex mirror element may have an f/# smaller than 1. For example, if f/#=0.5, the viewing angle ψ becomes 90 degrees, which is acceptable for many practical applications.

Second, the P/O conversion is unnecessary, if a positive lenslet array is used for direct camera pickup.

Third, it is easy to realize 3-D movies with large screens even if a small size of display panels or film is used. This is because the display panel and the screen are separated, and thus the size of elemental images that are projected onto the screen can be controlled easily by use of the relay optics.

Forth, flipping-free observations of 3-D images are possible even if optical barriers are not used. This is because each elemental image can be projected only onto its corresponding micro-convex mirror.

Fifth, it is easy to implement spatial multiplexing or temporal multiplexing or both in PII. To display 3-D images with high-resolution and large depth-of-focus, the number of pixels in the entire set of elemental images should be sufficiently large. Because display panels that are currently available or near future cannot meet such requirement, spatial multiplexing or temporal multiplexing or both may be needed to display the entire set of high-resolution elemental images.

In the experiments below, PII was used using a micro-convex-mirror array screen. However, this disclosure is not limited only to use of the structures used in these exemplary embodiments and experiments below.

Longitudinal Depth Control of 3-D Images

3-D images reconstructed in II systems may have limited depth-of-focus δ. It has been shown that δ cannot be larger than $1/(\lambda \rho^2)$ where λ is the display wavelength and ρ is the resolution of reconstructed 3-D images. ρ is defined as the inverse of the reconstructed image spot size. In PII, 3-D images with high resolution can be reconstructed only near the projection screen of micro-convex-mirror arrays (or the display lenslet array). Thus the depth-of-focus δ should be measured from the projection screen.

Suppose that one is trying to pickup an object positioned beyond the depth-of-focus range. Specifically, the front surface of the object, whose longitudinal thickness is T, is positioned at $z=z_o>\delta$. When the focal lengths of the pickup lenslets and the micro-convex-mirrors in the projection screen are equal in magnitude, a 3-D image is reconstructed either at $z=z_o$ for real image display or at $z=-z_o$ for virtual image display. Thus, in this example, a focused 3-D image cannot be displayed because the image position is beyond the range of depth-of-focus. Therefore, control of the depth (and thus position) of the reconstructed 3-D integral images to be displayed is needed so that it can be reconstructed near the screen, i.e., within the depth-of-focus.

Linear Depth Control by Zooming the Elemental Images

If the focal length of the pickup lenslet array $f_p$, is longer than that of the display micro-convex-mirror array $f_d$, the longitudinal scale of reconstructed image space is reduced linearly by a factor of $f_d/f_p \equiv r$ while the lateral scale does not change. So if $(z_o+T)r<\delta$, the 3-D reconstructed image is well focused.

One solution to pickup objects at various longitudinal positions and display their images within the depth-of-focus of II systems, therefore, is to use a pickup lenslet array with a variable focal length $f_p$, or an array of micro-zoom lenses. If $f_p$, is increased by a factor of $\alpha$, every elemental image is also magnified by that factor, according to geometrical optics. Therefore, digital zoom-in can be used, even if $f_p$, is fixed. In other words, by digitally magnifying every elemental images in a computer by a factor of $\alpha$, r can be changed as $$r = \frac{f_d}{\alpha f_p}. \quad (2)$$

Then, an orthoscopic virtual image is reconstructed at $z=-rz_o$ for the object positioned at $z=z_o$ in the pickup process.

Digital zoom-in may degrade the resolution of elemental images. When $z_o \to \infty$ and the object is very large, a nonlinear depth control method may be used.

Nonlinear Depth Control Using Curved Pickup Devices

Figure 3A:
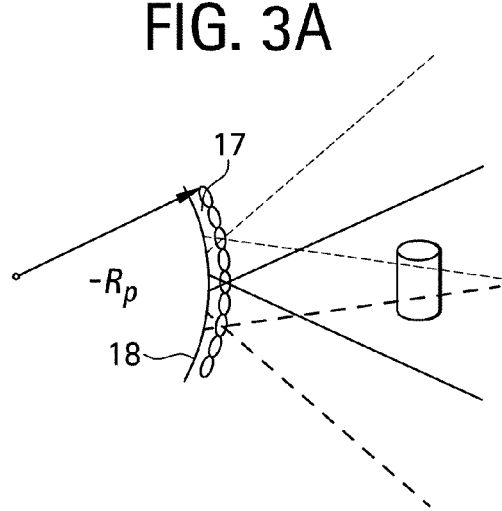
FIGS. 3a, 3b, 3c, 3d, 3e, and 3f are side views of non-linear depth control arrangements using curved devices.
Figure 3B:
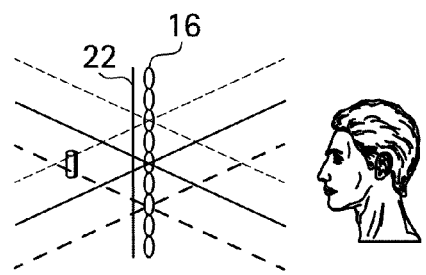
Figure 3C:
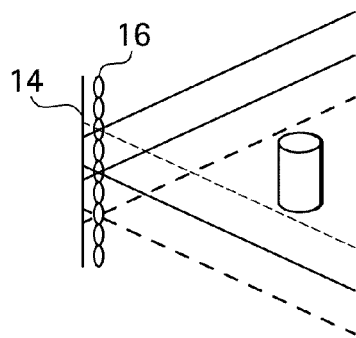

For a large object that is far away, elemental images are almost identical because parallax of the object is small for neighboring pickup lenslets. When such elemental images are displayed in the II system, the reconstructed image may be seriously blurred and not easily seen. A curved pickup devices (e.g., a curved lenslet array 17 and a curved 2-D image sensor 18) with a radius of curvature R may be used, and then 3-D images may be reconstructed using planar display devices as depicted in FIGS. 3(a) and (b), respectively. Similarly, planar pickup devices (e.g., a planar image sensor 14 and a planar lenslet array 16) and curved display devices (e.g., a curved display panel 19 and a curved lenslet array 20) may be used as depicted in FIGS. 3(c) and (d), respectively. The following sign convention is used: R>0, when the center of the curvature is positioned at the same side of the object (observer 6) in the pickup (display) process; and R<0 when it is positioned at the opposite side.

The use of a negatively curved pickup lenslet array increases disparity of neighboring elemental images. This is because pickup directions of the lenslets in a curved array are not parallel and thus their fields of view are more separated than those for a planar array. Such elemental images may also be obtained if the object of a reduced size near the pickup lenslet array is picked up. Therefore, when elemental images with increased disparity are displayed on a planar display screen (a micro-convex-mirror array), an integral image with a reduced size is reconstructed near the screen. By controlling R, 3-D images of large objects that are far away can be displayed within the depth-of-focus of the II system.

Figure 3D:
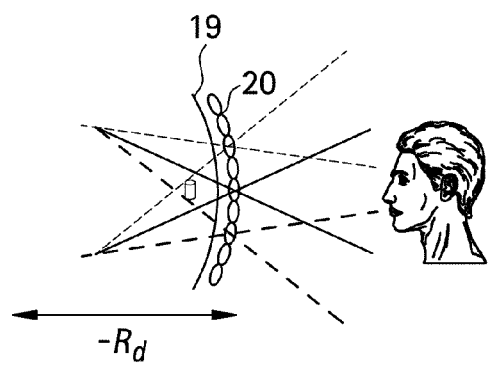
Figure 3E:
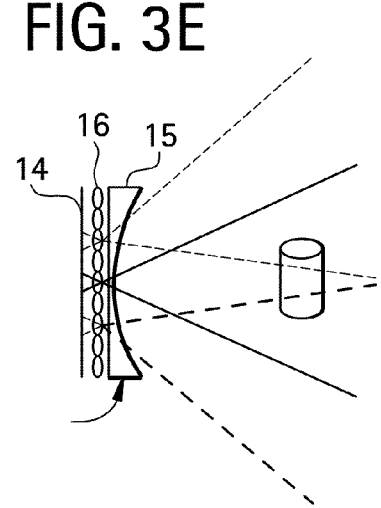
Figure 3F:
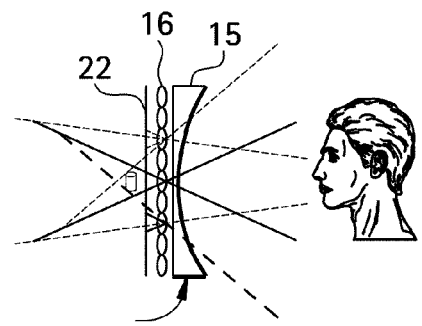

The effect of depth and size reduction using the negatively curved pickup lenslet array can be analyzed by introducing a hypothetical thin lens with a negative focal length $-R_p$, which is in contact with the planar pickup lenslet array 16, as depicted in FIG. 3(e). This is because ray propagation behaviors for the two setups in FIGS. 3(a) and 3(e), and those in FIGS. 3(d) and 3(f) are the same, respectively. We call this lens an optical path-length-equalizing (OPLE) lens 15. When two thin lenses with focal length $f_1$ and $f_2$ are in contact, the effective focal length becomes $f_1 f_2/(f_1+f_2)$. To get complete equivalence between the two setups, the focal length of the lenslet array 16 that is in contact with the OPLE lens 15 should be $f_p^e = R_p f_p/(R_p + f_p)$, where $f_p$ is the focal length of the curved pickup lenslets 17. In general, $R_p >> f_p$ and thus $f_p^e \approx f_p$. Therefore, instead of using the curved pickup lenslet array 17 with a radius of curvature $-R_p$, and a focal length $f_p$, and a curved image sensor 18 in the analysis, a planar lenslet array 16 with a focal length $f_p^e$ may be used, a flat image sensor 14, and the pickup OPLE lens 15 with a focal length $-R_p$.

The OPLE lens 15 first produces images of objects, and then the images are actually picked up by the planar pickup devices 14, 16 to produce elemental images with increased disparity. For an object positioned at $z=z_o(>0)$, the OPLE lens 15 produces its image according to Eq. (1) at $$z = \frac{R_p z_o}{R_p + z_o} \equiv z_i \quad (3)$$

As $z_o$ varies from $\infty$ to 0, $z_i$ changes from $R_p$, to 0. The elemental images with increased disparity are projected onto a planar micro-convex-mirror array screen, a virtual image is reconstructed at $z=-z_i$ if $f_d=f_p$. Therefore, $R_p$, should be shorter than the depth-of-focus of the II system. Lateral magnification of the OPLE lens is given by $z_i/z_o(<1)$ according to geometrical optics.

As shown in FIG. 3(d), the effect of depth and size reduction can also be achieved by use of negatively curved display devices 19, 20. Suppose that curved display devices 19, 20 with a radius of curvature $-R_d$ are used, while elemental images are obtained by use of planar pickup devices 14, 16. As before, a hypothetical display OPLE lens 15 is introduced to planar display devices (e.g., planar lenslet array 16 and planar display panel 22). Then, an orthoscopic virtual image of the object is reconstructed at $$z = -\frac{R_d z_o}{R_d + z_o} \quad (4)$$

for the object positioned at $z=z_o(>0)$ in the pickup process, if $f_d=f_p$.

Combination of Linear and Nonlinear Depth Control Methods

In general, both linear and nonlinear depth control methods may be used together. For an object positioned at $z=z_o$, the position of the reconstructed image can be predicted from the equivalent planar pickup 14, 16 and display 22, 16 devices with OPLE lenses. The pickup OPLE lens produces an image of the object at $z=z_i$ where $z_i$ is given in Eq. (3). From this image, elemental images with increased disparity are obtained and then they are digitally zoomed-in. Then, the planar display lenslet array 16 produces an intermediate reconstructed image at $z=-rz_i$ where r is given in Eq. (2). Because of the display OPLE lens 15, from the Gauss lens law the final reconstructed image is obtained at $z=-z_r$ where $$z_r = \frac{rR_p R_d z_o}{(rR_p + R_d)z_o + R_p R_d} \quad (5)$$

As $z_o$ varies from $\infty$ to 0, $z_r$ changes from $rR_p R_d/(rR_p+R_d)$ to 0.

Other System Factors that Influence 3-D Image Depth and Size

The Use of a Modified Pickup System

Figure 4A:
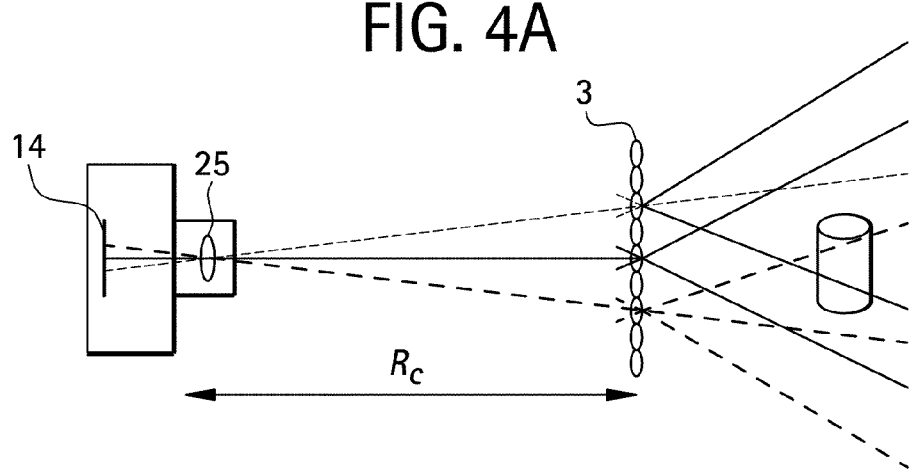
FIGS. 4a and 4b are side views of modified pick up systems.
Figure 4B:
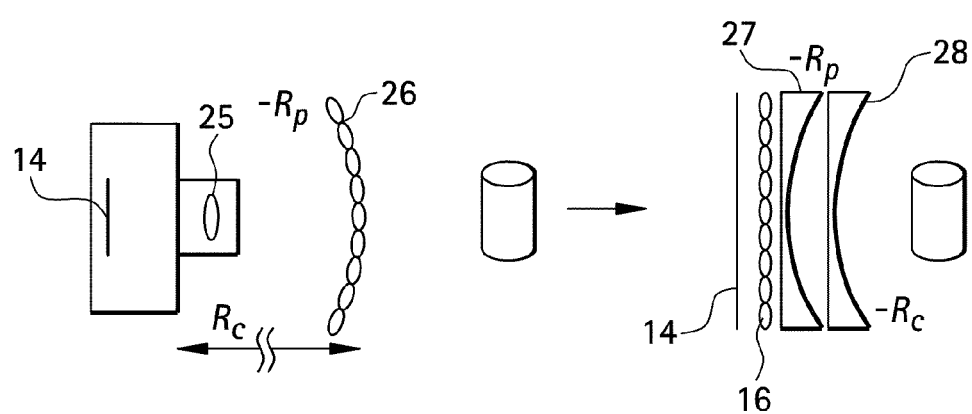

Because the physical size of the 2-D image sensor 14 is smaller than that of the pickup lenslet array 3, a modified pickup system is usually used as depicted in FIG. 4(*a*). Here, elemental images formed by a planar lenslet array 3 are detected through a camera lens 25 with a large f/#. The use of such a camera lens 25 and the planar pickup lenslet array 3 produces the effect of a negatively curved pickup lenslet array, because disparity of elemental images increases. This effect is taken into account, by considering the modified pickup system as a curved pickup system with a curved lenslet array whose radius of curvature is $-R_c$. $R_c$ equals approximately the distance between the planar pickup lenslet array and the camera lens.

Therefore, if elemental images are detected through a camera lens 25 when a curved pickup lenslet array 26 is used with the radius of curvature $R_p$ as depicted in FIG. 4(*b*), the actual radius of curvature of the pickup lenslet array 26 is considered to be $$R_p^e = \frac{R_c R_p}{R_c + R_p} \qquad (6)$$

This is treated in this experiment as the equivalent of planar pickup devices (14, 16) with two OPLE lenses (27, 28). In this case, we replace $R_p$ with $R_p^e$ in Eq. (5).

Diverging Projection of Elemental Images

Figure 5A:
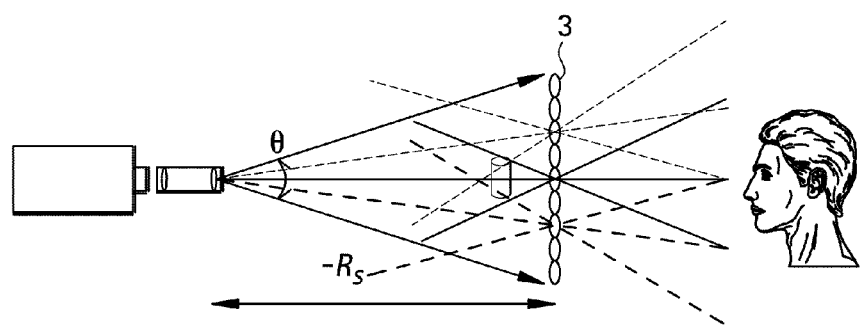
FIGS. 5a, 5b, and 5c show divergent projection methods.
Figure 5B:
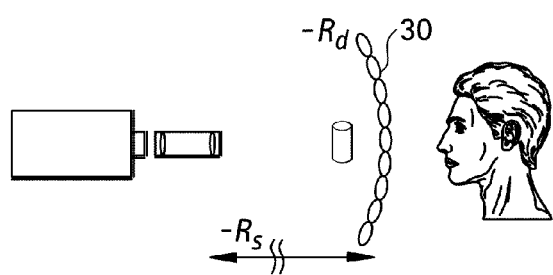
Figure 5C:
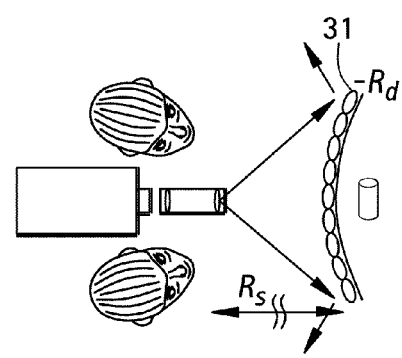

As depicted in FIG. 5(*a*), when elemental images are projected onto a lenslet array 3 screen, the projection beam angle θ (e.g., in the azimuthal direction) may not be negligible. In this case, the effect of negatively curved display devices naturally exists even if planar display devices are used. Suppose that the horizontal size of the overall projected elemental images on the screen is S. Then, one can consider the planar display devices as curved display devices with a radius of curvature $-R_s \approx -S/\theta$ if the aperture size of the relay optics is much smaller than S. In fact, $R_s$ is approximately equal to the distance between the planar projection screen and the relay optics.

Suppose that such a diverging projection system is used in a negatively curved lenslet array 30 with the radius of curvature $-R_d$ as depicted in FIG. 5(*b*) or in a negatively curved micro-convex-mirror array 31 as in FIG. 5(*c*). The actual radius of curvature of the display screen in the non-diverging system is:

$$R_d^e = \frac{R_s R_d}{R_s + R_d}. \qquad (7)$$

In this case, one would have to replace $R_d$ with $R_d^e$ in Eq. (5).

Experiments

System Description

Figure 6A:
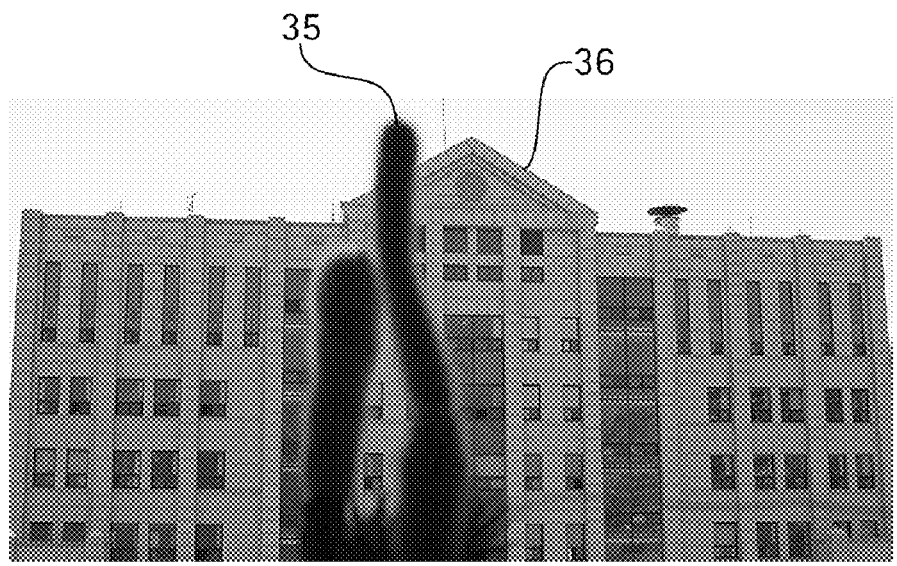
FIG. 6a shows examples of objects to be imaged.
Figure 6B:
FIG. 6b shows a modified pick up lens system attached to a digital camera.

The object to be imaged is composed of a small cacti 35 and a large building 36 as shown in FIG. 6(*a*). The distance between the pickup lenslet array and the cacti 35 is approximately 20 cm and that between the pickup lenslet array and the building is approximately 70 m. Because curved pickup devices were not available for this experiment, elemental images were obtained by use of a planar 2-D image sensor and a planar lenslet array in contact with a large-aperture negative lens as an OPLE lens. The focal length and the diameter of the negative lens are 33 cm ($=R_p$) and 7 cm, respectively. The planar pickup lenslet array used is made from acrylic, and has 53×53 plano-convex lenslets. Each lenslet element is square-shaped and has a uniform base size of 1.09 mm×1.09 mm, with less than 7.6 μm separating the lenslet elements. The focal length of the lenslets is approximately 3 mm ($=f_p$). A total of 48×36 elemental images are used in the experiments.

A digital camera 37 with 4500×3000 CMOS pixels was used for the 2-D image sensor. The camera pickup system 37 is shown in FIG. 6(*b*). In this modified pickup system, $R_c \approx 20$ cm. From Eq. (6), $R_p^e = R_c = 20$ cm, when the OPLE lens is not used; and $R_p^e = 12.5$ cm, when the OPLE lens is used.

The linear depth reduction method was also used in combination with the nonlinear method. To avoid resolution degradation caused by digital zoom-in, the resolution of the zoom-in elemental images was kept higher than that of the LCD projector. Four different α's are used: $\alpha_1 = 1$, $\alpha_2 = 1.5$, $\alpha_3 = 2$, and $\alpha_4 = 2.5$. A planar micro-convex-mirror array for the projection screen was obtained by coating the convex surface of a lenslet array that is identical to the pickup lenslet array. Light intensity reflectance of the screen is more than 90%. The focal length of each micro-convex mirror is 0.75 mm ($=f_d$) in magnitude. Because $f_p = 3$ mm, linear depth squeezing rates are $r_1 = 1/4$, $r_2 = 1/6$, $r_3 = 1/8$, and $r_4 = 1/10$ from Eq. (2) for $\alpha_1, \alpha_2, \ldots, \alpha_4$, respectively.

Figure 7:
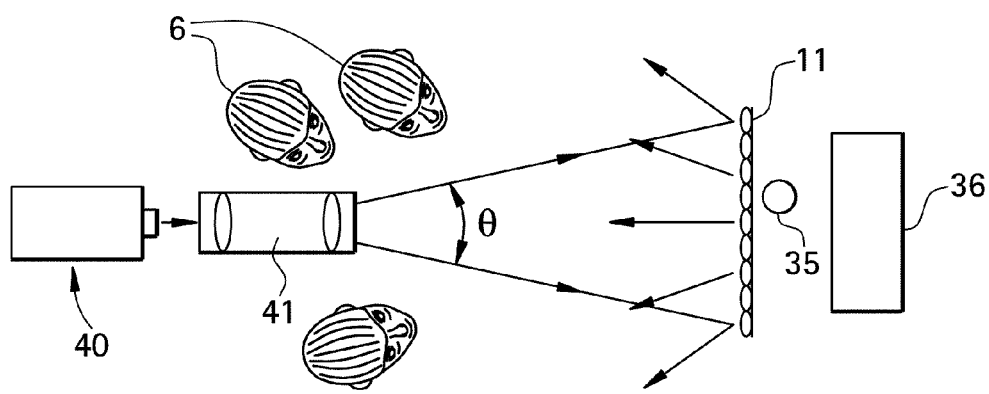
FIG. 7 shows a top view of optical set up for 3D image display which includes a micro-convex mirror array.
Figure 8A:
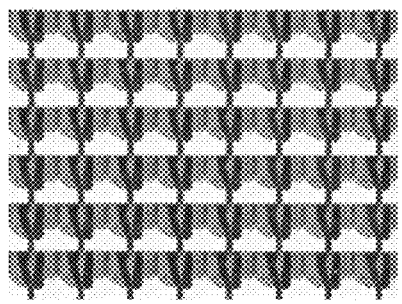
FIGS. 8a, 8b, 8c and 8d show center parts of elemental images.
Figure 8B:
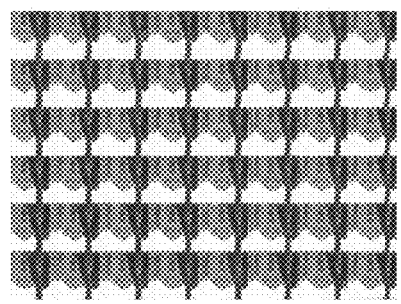
Figure 8C:
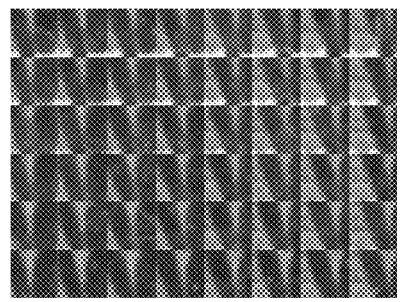
Figure 8D:
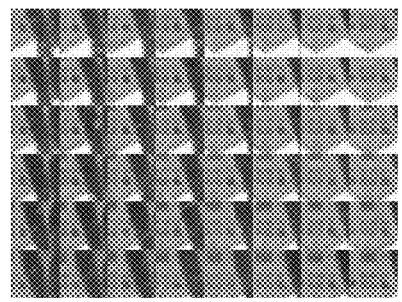

The setup for 3-D image reconstruction is depicted in FIG. 7. A color LCD projector 40 that has 3 (red, green, and blue) panels was used for elemental image projection. Each panel has 1024×768 square pixels with a pixel pitch of 18 μm. Each elemental image has approximately 21×21 pixels on average. Magnification of the relay optics 41 is 2.9. The diverging angle of the projection beam θ is approximately 6 degrees in the azimuthal direction. The effect of curved display devices slightly exists. The distance between the screen and the relay optics is approximately 48 cm. Because S=52.3 mm, $R_s \approx 50$ mm. From Eq. (7), $R_d^e = 50$ cm, because $R_d = \infty$ in the experiments.

The position of cacti 35 is denoted by $z_{oc}$, (=20 cm) and that of the building 36 by $z_{ob}$, (=70 m). For different r's and $R_p$'s, one can estimate the position of the reconstructed image for the cacti $z = -z_{rc}$ and that for the building $z = -z_{rb}$ from Eq. (5). They are illustrated in Table 1.

TABLE 1

Estimated Positions of Reconstructed Images[a]

| | $R_p^e$ (cm) | | | | | | | |
|---|---|---|---|---|---|---|---|---|
| | 20 | | | | 12.5 | | | |
| | r | | | | | | | |
| | /4 | /6 | /8 | /10 | /4 | /6 | /8 | /10 |
| $z_{rc}$ (cm) | .38 | .61 | .22 | .98 | .85 | .25 | .94 | .76 |
| $z_{rb}$ (cm) | .53 | .12 | .37 | .92 | .94 | .00 | .51 | .22 |

[a] Other parameters: $R_d^e = 50$ cm; $z_{oc} = 20$ cm; and $z_{ob} = 70$ m.

Experimental Results

Center parts of elemental images that were obtained without the OPLE lens and those obtained with the OPLE lens are shown in FIGS. 8(*a*) and 8(*b*), respectively. When α=2.5, digitally zoomed-in elemental images for those in FIGS. 8(*a*) and 8(*b*) are illustrated in FIGS. 8(*c*) and 8(*d*), respectively. One can see that the OPLE lens increases disparity between neighboring elemental images.

Figure 9:
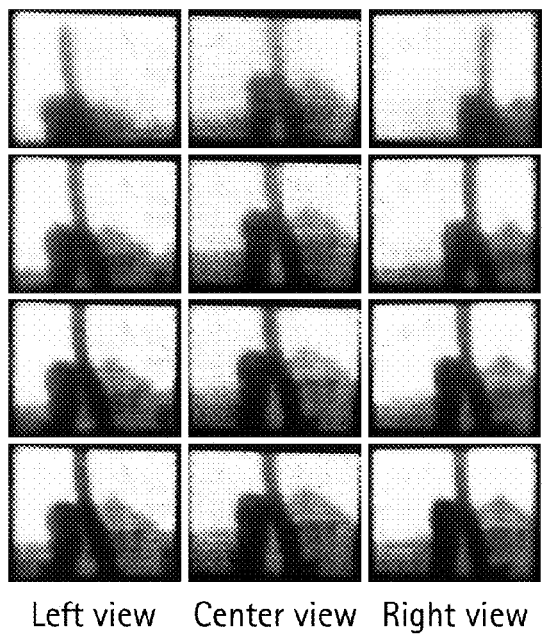
FIG. 9 shows reconstructed orthoscopic virtual 3-D images when an optical path-length-equalizing (OPLE) lens was not used.
Figure 10:
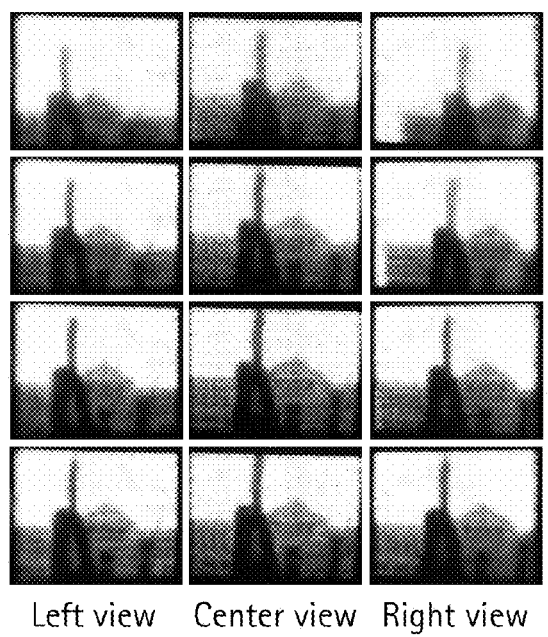
FIG. 10 shows reconstructed orthoscopic virtual 3-D images when an OPLE lens was used.

When elemental images are projected onto the planar micro-convex-mirror array, 3-D orthoscopic virtual images are reconstructed. The measured viewing angle was 60~70 degrees, which agrees well with the predicted value. To observers who move beyond the viewing angle range, the entire reconstructed image disappears. Higher-order reconstructed images were hardly observed for a well-aligned system. Left, center, and right views of reconstructed 3-D images for different depth control parameters are illustrated in FIGS. 9 and 10. The observed positions of the reconstructed images agree qualitatively with the estimated positions given in Table 1. Comparing the images shown in FIGS. 9 and 10, one can see that smaller 3-D images are reconstructed for shorter $R_p^e$. As r decreases, reconstructed 3-D images squeeze further in the longitudinal direction and thus disparity between left and right views reduces. The lateral size of reconstructed 3-D images is independent of r. Reconstructed 3-D images at deeper positions are more blurred because the depth-of-focus of the PII system is limited, which is estimated to be 5 cm approximately.

Binocular parallax is the most effective depth cue for viewing medium distances. In general, our depth control method degrades solidity of reconstructed 3-D images because it squeezes their longitudinal depth more excessively than the lateral size for distant objects. However, human vision also uses other depth cues, and binocular parallax may not be so effective for viewing long distances. Therefore, our nonlinear position control method can be efficiently used for large-scale 3-D display system with limited depth-of-focus. Nevertheless, efforts to enhance the depth-of-focus of II systems should be pursued.

In conclusion, at least a method, apparatus and system to control depth and lateral size of reconstructed 3-D images in II have been presented, in which a curved pickup lenslet array or a curved micro-convex-mirror (display lenslet) array or both may be used. When lenslets in the curved array have a zooming capability, a linear depth control is additionally possible. Using both control methods, it has been shown that large objects in far distances can be reconstructed efficiently by the II system with limited depth-of-focus. This control will be useful for realization of 3-D television, video, and movie based on II.

Some embodiments of the invention have the following advantages: imaging is performed with direct pickup to create true 3-D image formations with full parallax and continuous viewing points with incoherent light using two-dimensional display devices resulting in orthoscopic images with wide viewing angles, large depth of focus and high resolution. Additional advantages include the ability to project 3-D images to a large display screen.

One of ordinary skill in the art can appreciate that a computer or other client or server device can be deployed as part of a computer network, or in a distributed computing environment. In this regard, the methods and apparatus described above and/or claimed herein pertain to any computer system having any number of memory or storage units, and any number of applications and processes occurring across any number of storage units or volumes, which may be used in connection with the methods and apparatus described above and/or claimed herein. Thus, the same may apply to an environment with server computers and client computers deployed in a network environment or distributed computing environment, having remote or local storage. The methods and apparatus described above and/or claimed herein may also be applied to standalone computing devices, having programming language functionality, interpretation and execution capabilities for generating, receiving and transmitting information in connection with remote or local services.

The methods and apparatus described above and/or claimed herein is operational with numerous other general purpose or special purpose computing system environments or configurations. Examples of well known computing systems, environments, and/or configurations that may be suitable for use with the methods and apparatus described above and/or claimed herein include, but are not limited to, personal computers, server computers, hand-held or laptop devices, multiprocessor systems, microprocessor-based systems, network PCs, minicomputers, mainframe computers, distributed computing environments that include any of the above systems or devices.

The methods described above and/or claimed herein may be described in the general context of computer-executable instructions, such as program modules, being executed by a computer. Program modules typically include routines, programs, objects, components, data structures, etc. that perform particular tasks or implement particular abstract data types. Thus, the methods and apparatus described above and/or claimed herein may also be practiced in distributed computing environments such as between different units where tasks are performed by remote processing devices that are linked through a communications network or other data transmission medium. In a typical distributed computing environment, program modules and routines or data may be located in both local and remote computer storage media including memory storage devices. Distributed computing facilitates sharing of computer resources and services by direct exchange between computing devices and systems. These resources and services may include the exchange of information, cache storage, and disk storage for files. Distributed computing takes advantage of network connectivity, allowing clients to leverage their collective power to benefit the entire enterprise. In this regard, a variety of devices may have applications, objects or resources that may utilize the methods and apparatus described above and/or claimed herein.

Computer programs implementing the method described above will commonly be distributed to users on a distribution medium such as a CD-ROM. The program could be copied to a hard disk or a similar intermediate storage medium. When the programs are to be run, they will be loaded either from their distribution medium or their intermediate storage medium into the execution memory of the computer, thus configuring a computer to act in accordance with the methods and apparatus described above.

The term "computer-readable medium" encompasses all distribution and storage media, memory of a computer, and any other medium or device capable of storing for reading by a computer a computer program implementing the method described above.

Thus, the various techniques described herein may be implemented in connection with hardware or software or, where appropriate, with a combination of both. Thus, the methods and apparatus described above and/or claimed herein, or certain aspects or portions thereof, may take the form of program code or instructions embodied in tangible media, such as floppy diskettes, CD-ROMs, hard drives, or any other machine-readable storage medium, wherein, when the program code is loaded into and executed by a machine, such as a computer, the machine becomes an apparatus for practicing the methods and apparatus of described above and/or claimed herein. In the case of program code execution on programmable computers, the computing device will generally include a processor, a storage medium readable by the processor, which may include volatile and non-volatile memory and/or storage elements, at least one input device, and at least one output device. One or more programs that may utilize the techniques of the methods and apparatus described above and/or claimed herein, e.g., through the use of a data processing, may be implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus described above and/or claimed herein may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or a receiving machine having the signal processing capabilities as described in exemplary embodiments above becomes an apparatus for practicing the method described above and/or claimed herein. When implemented on a general-purpose processor, the program code combines with the processor to provide a unique apparatus that operates to invoke the functionality of the methods and apparatus described above and/or claimed herein. Further, any storage techniques used in connection with the methods and apparatus described above and/or claimed herein may invariably be a combination of hardware and software.

The operations and methods described herein may be capable of or configured to be or otherwise adapted to be performed in or by the disclosed or described structures.

While the methods and apparatus described above and/or claimed herein have been described in connection with the preferred embodiments and the figures, it is to be understood that other similar embodiments may be used or modifications and additions may be made to the described embodiment for performing the same function of the methods and apparatus described above and/or claimed herein without deviating therefrom. Furthermore, it should be emphasized that a variety of computer platforms, including handheld device operating systems and other application specific operating systems are contemplated, especially given the number of wireless networked devices in use.

While the description above refers to particular embodiments, it will be understood that many modifications may be made without departing from the spirit thereof. The accompanying claims are intended to cover such modifications as would fall within the true scope and spirit of the present invention.

What is claimed:

1. A method of displaying three-dimensional images of an object using projection integral imaging, the method comprising:
   projecting integral images to a display device; and
   displaying three-dimensional images with the display device;
   wherein the display device is curved;
   wherein the display device comprises:
      a curved display panel; and
      a curved lenslet array;
   wherein the curved display panel has a radius of curvature of $-R_d$; and
   wherein the displaying three-dimensional images with the display device comprises reconstructing an orthoscopic image of the object at a position $z=-R_d z_0/R_d+z_0$, where $z=0$ is a position of the curved lenslet array, $z_0$ is a position of the object with respect to the $z=0$ position during an image pickup process.

2. The method of claim 1, further comprising:
relaying the images from a projector to the display device through relay optics.

3. The method of claim 2, further comprising:
converting pseudoscopic images to orthoscopic images with a lenslet array.

4. The method of claim 3, further comprising:
focusing orthoscopic images with a lenslet array with a positive focal length.

5. The method of claim 2, further comprising:
focusing orthoscopic images with a lenslet array with a negative focal length.

6. The method of claim 2, further comprising:
converting pseudoscopic images to orthoscopic images with a micro-concave-mirror array.

7. The method of claim 6, further comprising:
focusing orthoscopic images with a micro-concave-mirror array.

8. The method of claim 2, further comprising:
focusing orthoscopic images with a micro-convex-mirror array.

9. The method of claim 8, further comprising:
increasing a viewing angle by using the micro-convex-mirror array as a display screen.

10. The method of claim 8, further comprising:
diverging the projected images with the relay optics to a large micro-convex-mirror array.

11. The method of claim 8, further comprising:
projecting each elemental image to a unique micro-convex mirror.

* * * * *

UNITED STATES PATENT AND TRADEMARK OFFICE
CERTIFICATE OF CORRECTION

| | | |
|---|---|---|
| PATENT NO. | : 8,264,772 B2 | |
| APPLICATION NO. | : 12/939647 | |
| DATED | : September 11, 2012 | |
| INVENTOR(S) | : Javidi et al. | |

It is certified that error appears in the above-identified patent and that said Letters Patent is hereby corrected as shown below:

On the Title Page, in Item (75), under "Inventors", in Column 1, Line 2, after "Jang,", insert -- Deceased --.

On Title Page 2, in Item (56), under "OTHER PUBLICATIONS", in Column 1, Line 4, delete "Repot" and insert -- Report --, therefor.

In Column 4, Line 4, delete "$z=+g_r$," and insert -- $z=+g_r$, --, therefor.

In Column 5, Line 2, delete "$f_p$," and insert -- $f_p$ --, therefor.

In Column 5, Line 11, delete "$f_p$," and insert -- $f_p$ --, therefor.

In Column 5, Line 12, delete "$f_p$," and insert -- $f_p$ --, therefor.

In Column 5, Line 14, delete "$f_p$," and insert -- $f_p$ --, therefor.

In Column 6, Line 6, delete "-$R_p$," and insert -- -$R_p$ --, therefor.

In Column 6, Line 22, delete "$R_p$," and insert -- $R_p$ --, therefor.

In Column 6, Line 25, delete "$R_p$," and insert -- $R_p$ --, therefor.

In Column 8, Line 26, delete "$\alpha_1$," and insert -- $\alpha_1$, --, therefor.

In Column 8, Line 40, delete "$z_{ob}$," and insert -- $z_{ob}$ --, therefor.

Signed and Sealed this
Twenty-ninth Day of January, 2013

David J. Kappos
*Director of the United States Patent and Trademark Office*